(12) United States Patent
Hagerling et al.

(10) Patent No.: US 6,987,391 B2
(45) Date of Patent: Jan. 17, 2006

(54) APPARATUS FOR AND METHOD OF SYNCHRONOUS REJECTION

(75) Inventors: Carl W. Hagerling, Chagrin Falls, OH (US); Carl G. Andeen, Euclid, OH (US); Stephen E. Flocke, Lyndhurst, OH (US)

(73) Assignee: Andeen-Hagerling, Inc., Solon, OH (US)

( * ) Notice: Subject to any disclaimer, the term of this patent is extended or adjusted under 35 U.S.C. 154(b) by 0 days.

(21) Appl. No.: 10/869,560

(22) Filed: Jun. 16, 2004

(65) Prior Publication Data

US 2004/0251915 A1    Dec. 16, 2004

Related U.S. Application Data

(60) Provisional application No. 60/478,999, filed on Jun. 16, 2003.

(51) Int. Cl.
  *G01R 29/26*    (2006.01)
(52) U.S. Cl. .................. 324/614; 324/628; 455/63.1; 455/304
(58) Field of Classification Search ............... 324/614, 324/628; 455/63.1, 304
See application file for complete search history.

(56) References Cited

U.S. PATENT DOCUMENTS

| 4,772,844 A | 9/1988 | Andeen et al. ............. 324/651 |
| 5,276,430 A | 1/1994 | Granovsky ............... 340/572.4 |
| 6,204,673 B1 | 3/2001 | Andeen et al. ............. 324/725 |
| 6,498,820 B1 | 12/2002 | Thomson et al. ........... 375/346 |

*Primary Examiner*—Walter Benson
(74) *Attorney, Agent, or Firm*—Renner, Otto, Boisselle & Sklar, LLP

(57) ABSTRACT

Methods of improving a signal to noise ratio using synchronous rejection are enclosed. Also disclosed are various synchronous rejection systems. In one method of synchronous rejection, the method includes correlating a phase of a reference signal to a phase of the interference signal; collecting a first data set during a first period of time using the reference signal; inverting the reference signal and re-correlating the phase of the reference signal to the phase of the interference signal; collecting a second data set during a second period of time using the inverted reference signal; and integrating the first and the second data set.

42 Claims, 6 Drawing Sheets

FIG. 6 Legend
—— Conventional Synchronous Detection (CSD, No commutation)
······ Synchronous Detection with Asynchronous Commutation (SDAC)
— · — Synchronous Rejection

APPARATUS FOR AND METHOD OF SYNCHRONOUS REJECTION

RELATED APPLICATION DATA

This application claims priority from U.S. Provisional Patent Application No. 60/478,999, filed Jun. 16, 2003, the disclosure of which is herein incorporated by reference in its entirety.

TECHNICAL FIELD

The present invention relates generally to the field of circuits and methods of improving the quality of a desired signal and, more particularly, to an apparatus and method of reducing repeatable interference by synchronous rejection.

BACKGROUND

Improving signal-to-noise ratios has been a long sought goal of circuit designers in which a desired signal is present. The following is a brief review of some common methods for improving signal-to-noise ratios, and limitations and/or disadvantages of those techniques.

Band-Pass Filters

One of the most commonly used methods of signal filtering passes a response signal through a band-pass filter. This method works well if the desired signal has a narrow bandwidth. If the frequency of the desired signal can vary, then the band-pass filter must follow this changing frequency or its passband must be wide enough to pass the entire range of variation of the desired signal. The latter situation reduces the effectiveness of the filter.

Notch Filters

As the name implies, notch filters are filters that are designed to remove one specific interfering frequency. They can be made to remove a very narrow range of frequencies. They can be useful if the interfering signal has a low harmonic content, otherwise, additional notch filters might be required to remove the strongest harmonics. Notch filters are generally ineffective against interference which has the same frequency as a stimulus signal.

Synchronous Detection

Another noise rejection method that has been used with high precision stimulus-response (SR) systems is synchronous detection. Synchronous detection is also known as phase-sensitive detection, but synchronous detection will be referred to herein as conventional synchronous detection (CSD). The phrase "synchronous detection" is also sometimes used to describe a method of restoring a carrier in a sideband signal in a radio communications receiver.

In CSD, a periodic stimulus waveform is applied to a device under test (DUT). The desired signal is detected by multiplying the original stimulus signal with the response signal and integrating the result.

CSD is often effective in removing random noise. This method can also remove periodic interference provided the periodic interference and its harmonics are not close in frequency to the stimulus frequency. Periodic interference having frequency components close to the stimulus signal typically requires longer integration times to remove. If these integration times become longer than the desired response time of the system, then this method cannot give acceptable performance. For addition information regarding CSD, attention may be directed to Electronics, Noise and Signal Recovery by E. R. Davies, Academic Press, 1993 and Electronic Measurement and Instrumentation by Klaas B. Klaassen, Cambridge University Press, 1996.

Synchronous Detection with Commutation

The ability of synchronous detection to reject an interfering signal can be improved by commutating the stimulus signal. Commutation involves inverting the polarity of the stimulus signal at regular intervals. The desired signal is detected by multiplying the original commutated signal with the response signal and integrating the result over one or more pairs of the normal and inverted stimulus signal. Since the commutation transitions are not synchronized in any way with the interfering signal, this method will be referred to herein as synchronous detection with asynchronous commutation (SDAC).

The SDAC method has all the advantages of regular synchronous detection and, in addition, is able to remove interfering frequencies and their harmonics when the frequency of the interfering signal is extremely close to the stimulus frequency. Unfortunately, even small frequency differences on the order of a fraction of a percent between the stimulus signal and the interfering signal are sufficient to make the SDAC method troublesome. Small frequency differences may cause symptoms to appear in the form of an insidious beat frequency in the measurement results having a period of tens or hundreds of seconds.

For interference that is merely close in frequency to the stimulus signal, the SDAC method is likely to offer no improvement over CSD.

BACKGROUND SUMMARY

In view of the foregoing, there is a need in the art for a method and system for improving signal to noise ratios, particularly in stimulus-response systems.

SUMMARY OF THE INVENTION

According to an aspect of the invention, a method of reducing a periodic interference signal by synchronous rejection includes correlating a phase of a reference signal to a phase of the interference signal; collecting a first data set during a first period of time using the reference signal; inverting the reference signal and re-correlating the phase of the reference signal to the phase of the interference signal; collecting a second data set during a second period of time using the inverted reference signal; and integrating the first and the second data set.

BRIEF DESCRIPTION OF DRAWINGS

These and further features of the present invention will be apparent with reference to the following description and drawings, wherein.

DISCLOSURE OF INVENTION

Figure 1:
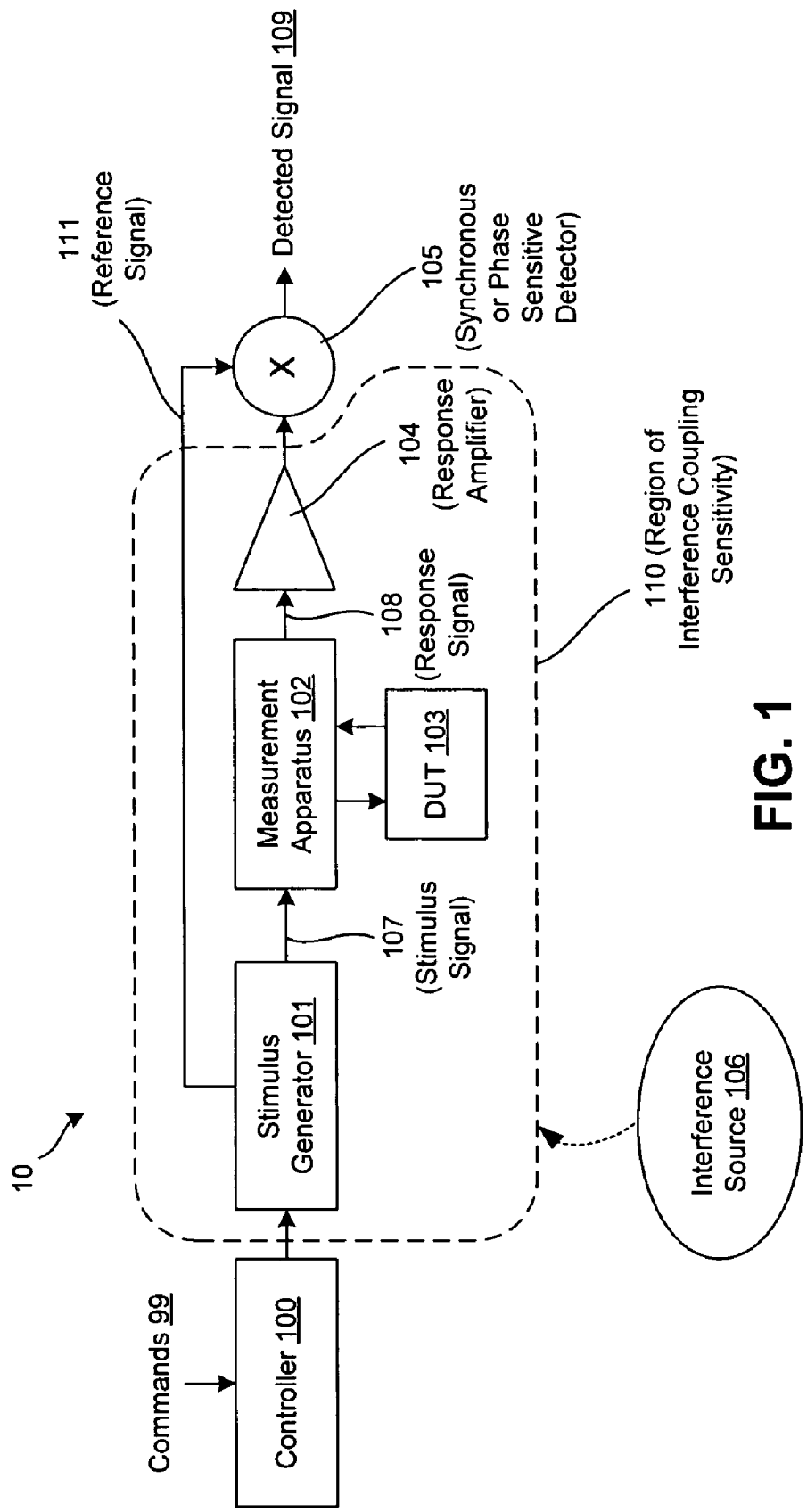
FIG. 1 is a schematic diagram of an example stimulus-response (SR) system to which the present invention can be applied.

In the detailed description that follows, similar components have been given the same reference numerals, regardless of whether they are shown in different embodiments. To illustrate the present invention in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Introduction

A class of electrical systems applies a stimulus signal to a device under test (DUT) and measures a resulting response from the stimulus signal. This class of systems will be referred to herein as stimulus-response (SR) systems. Generally, the stimulus signal is of an electrical nature at some point in the system. Furthermore, the stimulus signal can be periodic at a well-defined frequency. Stimulus signals are often, but not always, sinusoidal. The resulting response may be "picked-up" directly as an electrical signal or indirectly with a transducer that produces an electrical signal. The picked-up electrical response will be referred to herein as a response signal.

Referring now to FIG. 1, shown is a schematic diagram of an example SR system 10 to which synchronous rejection can be applied. It is noted that the synchronous rejection also can be applied to or incorporated into other circuits and systems, as will be appreciated by one of ordinary skill in the art.

A stimulus generator 101 that is under the control of a controller 100 (the controller commanded by commands 99) produces a stimulus signal 107. The commands 99 may be used for multiple purposes including setting the desired amplitude and frequency of signal 107. The stimulus signal 107 is input to a measurement apparatus 102 where the stimulus signal 107 is used to stimulate a DUT 103. The DUT 103 may be readily identifiable as a device or circuit component, or the DUT 103 may be a more abstract system or construction.

The measurement apparatus 102 and the DUT 103 generate a response signal 108 in response to the stimulus signal 107. The response signal 108 can be amplified by a response amplifier 104. The output of the response amplifier 104 and a reference signal 111 are input to a synchronous detector 105 where they are used to produce a detected signal 109. In the illustrated embodiment, the reference signal 111 and the stimulus signal 107 have exactly the same frequency. There is also a fixed phase shift between the signals 107 and 111, which is typically zero degrees, but which may be 90 degrees or many other fixed values. In other embodiments, the reference signal 111 and the stimulus signal 107 can have different frequencies, harmonics, phases and/or shapes.

A source of interference 106 exists that may have undesired coupling to a region of interference coupling sensitivity 110. This coupling can be of virtually any analog nature, including but not limited to electrical, mechanical, optical, thermal, acoustic, etc. The region 110 may comprise any or all analog circuitry and/or analog coupleable devices (e.g., devices that may absorb, be impacted by, receive or input interference from the source of interference 106) in the entire SR system.

As a result of the interference, the response signal 108 can comprise a desired signal component plus various kinds of noise. This noise generally falls into two classes. One class of noise is purely random, such as Johnson noise, shot noise and 1/f noise.

The other class of noise is interference generated by a signal source, such as, but not limited to power lines, radio transmitters and cathode ray tube (CRT) televisions and monitors. Interference from a signal source can be non-random and/or periodic. The noise may have a fundamental frequency and many harmonics of that fundamental frequency. It is this latter class of interference, as at least partially introduced into the SR system by coupling from the source of interference 106, that is addressed by the apparatus for and method of synchronous rejection described herein.

A challenge for many sensitive SR systems is to separate the desired signal from the undesired noise. Minimizing the coupling of noise into a system's measurement circuits can be a first line of defense. However, this is often not sufficient to reduce remaining noise relative to the desired signal. One aspect of the apparatus and methods described herein is to increase, or maximize, the signal-to-noise ratio (S/N ratio) of the detected signal 109.

In a typical embodiment of the SR system described herein, the SR system can make measurements using a stimulus signal having a frequency that is different than or the same as an interfering frequency and obtain a high S/N ratio. For example, the SR system described herein has improved noise reduction over prior art techniques, even when the fundamental frequency of the stimulus signal is at (e.g., the same as or about the same as) or near the fundamental frequency or a harmonic frequency of the interfering signal.

Certain aspects of a process of synchronous rejection described herein takes paired sets of readings, usually continuously. For example, a first set of a pair of reading sets can be made while noting the phase of the interfering signal with respect to the stimulus signal. As soon as possible thereafter, a second set of the pair of reading sets is made with the stimulus signal in an inverted state and starting substantially at the same time with respect to the interfering signal phase as the first set of readings. The stimulus and reference signals can be the same signal. Alternatively, the reference signal and the stimulus signal can be separate signals, which optionally can have different frequencies, harmonics, phases and/or shapes. However, to the extent that the reference signal differs from the stimulus signal, there may be not as much improvement in signal to noise ratio as when the reference signal and the stimulus signal have the same shapes, amplitudes, frequencies and harmonics.

Generally, the first set of readings is the sum of the desired signal and the interfering signal with all or nearly all of the harmonics of the interfering signal, while the second set of readings is the desired signal minus the interfering signal with all or nearly all of the harmonics of the interfering signal. Adding the average of the first set of readings to the average of the second set of readings causes the contributions of the desired signals to be added and the contributions from the interfering signal and the harmonics of the interfering signal to be cancelled, minimized or advantageously reduced. This technique of reducing noise from a system will be referred to herein as "synchronous rejection" or, alternatively, "synchronous detection with synchronous commutation" (SDSC).

Other usage or meanings of the term "correlate" notwithstanding, the term "correlate" can refer to 1) determining a timing relationship at a particular point in time between a pair of signals by identifying the time and/or phase shift between a reference point on one signal relative to a reference point on the other signal; or 2) obtaining a predetermined timing relationship at a particular point in time between a pair of signals by adjusting the time and/or phase shift between a reference point on one signal relative to a reference point on the other signal. In the case of externally generated signals, a typical reference point may be a zero crossing with a particular slope. In the case of internally generated signals, a controller might maintain a register or memory location having a value representing a recent phase angle at a particular clock time.

Description of Apparatus

Figure 2:
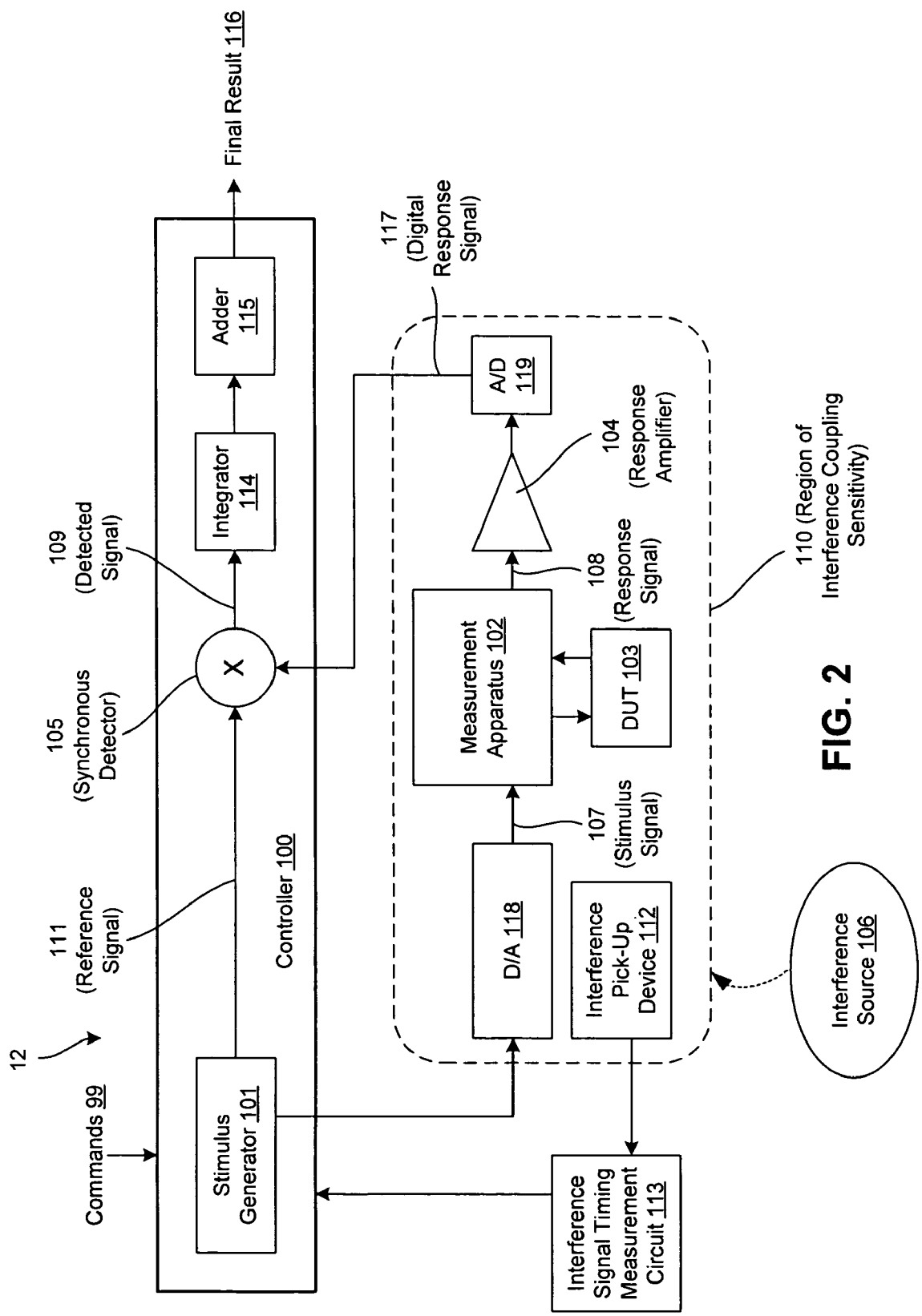
FIG. 2 is a schematic diagram of an example synchronous rejection system in accordance with the present invention.

An example synchronous rejection system 12 is shown in FIG. 2, which is an enhancement of the system of FIG. 1. An interference pick-up device 112 samples a signal generated by the interference source 106. This device 112 may be as simple as a wire that is directly connected to the interference source 106, or it may be more complex comprising, for example, a sensor and support circuitry that "picks-up" an electrical property and/or a non-electrical physical property. A signal from device 112 is input to an interference timing measurement circuit 113. The circuit 113 measures the phase and the period of the fundamental frequency of the interfering signal. Increases in the precision of the measurement of the phase and period of the fundamental frequency of the interfering signal can lead to corresponding improvements in synchronous rejection. The phase and period timing information is input to the controller 100.

The controller 100 can be, for example, a digital processing device that is fast enough to perform calculations on the signals described herein in real time. In one embodiment, the controller 100 can be a digital signal processor (DSP), but also can be implemented with other circuits or devices, including a logic execution system (e.g., a general purpose computer), a programmable device, a dedicated circuit, etc.

The stimulus generator 101 can be internal or external to the controller 100 and/or can be implemented with dedicated circuit components. As illustrated, the stimulus generator 101 is preferably implemented as part of the controller 100. Accordingly, the stimulus generator 101 can be implemented as executable code, as a script or as a language used (e.g., executed) by the controller 100. The generator 101 drives a digital to analog converter (D/A) 118, which converts a digital signal from the controller 100 to an analog stimulus signal 107. The D/A 118 can be implemented with dedicated circuit components and/or combined with or separate from the stimulus generator 101. The stimulus generator 101 may include the D/A function of the D/A 118. Similar to the system of FIG. 1, the stimulus signal 107 can be applied to a measurement apparatus 102 to take measurements of the DUT 103. A response signal 108 output by the measurement apparatus 102 is input to a response amplifier 104.

While it is possible to implement signal generation for synchronous rejection without using a DSP, or even a microprocessor, the use of DSPs combined with D/As for signal generation should be suitable for carrying out signal generation for synchronous rejection. A DSP and D/A combination can economically generate a satisfactory stimulus signal and satisfactorily control the phase and state of inversion of the stimulus signal.

The output of the response amplifier 104 is input to an analog to digital converter (A/D) 119 that, in turn, produces a digital response signal 117. Using code executed by the controller 100, the signal 117 and a reference signal 111 are multiplied by synchronous detector 105 to produce a detected signal 109. In the illustrated embodiment, the reference signal 111 and the stimulus signal 107 have exactly the same frequency. There is also a fixed phase shift between the signals 107 and 111, which is typically zero degrees, but which may be 90 degrees or many other fixed values. In other embodiments, the reference signal 111 and the stimulus signal 107 can have different frequencies, harmonics, phases and/or shapes. Preferably, the signals 107 and 111, and their inverted forms, repeat at determinable points in time.

Signal 109 is integrated by integrator 114 overtime intervals determined by the controller 100. The results of one or more pairs of integrations from 114 are summed by adder 115 to produce a final result signal(s) 116.

The functions of the stimulus generator 101, the synchronous detector 105, the integrator 114 and the adder 115 can be implemented as circuit components or embodied in executable code. If embodied as executable code, the code can be stored on a computer readable medium or implemented in software or firmware.

Description of Signals

Figure 3:
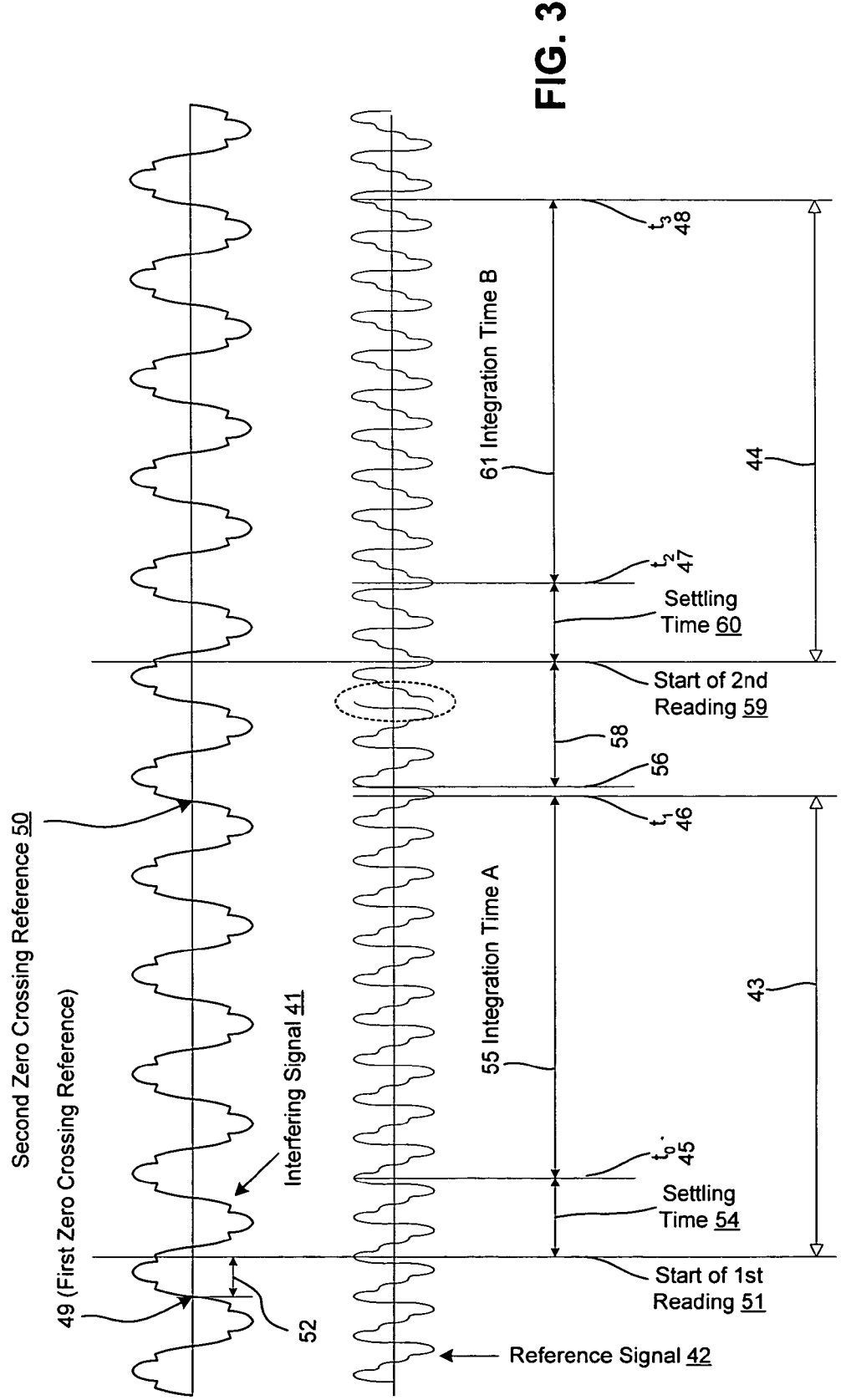
FIG. 3 is an example timing diagram of the synchronous rejection system of FIG. 2 during measurements using synchronous rejection in accordance with the present invention.

Synchronous rejection can be based on a pair of measurements taken over a relatively short period of time. FIG. 3 shows an example of the signal waveforms used to make a single such pair of measurements. The top waveform is an example of an interfering signal and will be referred to herein as an interfering waveform 41. This example shows a particular "non-smooth" waveform, but any repeatable waveshape, including but not limited to periodic waveshapes, can be rejected. A repeatable waveshape, as used herein, is a waveshape that substantially repeats over two distinct time periods (e.g., the waveshape from a first time period is substantially replicated over a second time period). The interfering signal can be a repeatable waveform. The reference and stimulus signals over a first time period can be repeated over a second time period as inverted versions of the signals over the first time period. Each of the interfering signal, reference signal and stimulus signal can be periodic in addition to being repeatable.

In general, the shape of this waveform is expected to vary considerably depending upon how and where the interfering waveform 41 is measured. In addition, the phase of the waveform 41 is also expected to vary depending upon how and where the interfering waveform 41 is measured. Nevertheless, maximizing rejection of the interfering waveform 41 can be accomplished in situations where the frequency, amplitude, harmonics, phase and wave shape of the interfering waveform 41 are substantially constant during the measurement time at any given location and for any given measurement technique. This is very typical behavior for power line related interference. The interfering waveform 41 in FIG. 3 is shown as having a constant shape, amplitude, harmonics, frequency and phase over the whole width of the figure. Without intending to be bound by theory, it is possible to remove essentially the entire interfering waveform 41 and harmonics thereof from the detected signal 109 when the frequency, amplitude, harmonics, phase and wave shape of the interfering waveform 41 is substantially constant during the time of the pair of measurements.

The bottom waveform in FIG. 3 is reference signal 42. The illustrated reference waveform 42 is a sine wave with a second harmonic, but any periodic wave shape may be used, including, for example, sine, square and Walsh wave shapes and wave shapes having even and/or odd harmonics. It is noted that a waveform with even harmonic content (e.g., second, fourth, sixth, etc.) cannot be phase shifted by 180 degrees to give the result that changing the state of inversion of the waveform would provide.

The reference waveform 42 in FIG. 3 is shown as having a constant shape, amplitude, harmonics, frequency and phase in the region 43 between time markers 51 and 46. The reference waveform 42 is also shown as having a constant shape, amplitude, harmonics, frequency and phase in the region 44 between time markers 59 and 48. The frequency is the same in both regions but the wave shape in the right region 44 is inverted relative to that in the left region 43. Furthermore, there is a phase shift in the reference signal 42 between the regions 43 and 44. This phase shift is independent of the 180 degree phase shift that results from inverting a sine wave or from inverting any other reference waveform containing only odd harmonics.

The detected signal 109 (FIG. 2) is integrated over a first time interval shown in FIG. 3 as integration time A 55, which starts at time marker $t_o$ 45 and ends at time marker $t_1$ 46. Similarly, the detected signal 109 is integrated over a second time interval labeled as integration time B 61, which starts at time marker $t_2$ 47 and ends at time marker $t_3$ 48.

In a typical embodiment, the stimulus signal may be used as the reference signal or the reference signal may be shifted in phase by a fixed amount relative to the stimulus signal. In a more general embodiment, the reference signal 111 and the stimulus signal 107 can have different frequencies, harmonics, phases and/or shapes. In each embodiment, it is preferred that the frequency, harmonic content, phase and shape of the signals 107 and 111 during integration time A 55 are respectively capable of being repeated in an inverted form during integration time B 61.

Technique(s) for Synchronous Rejection

The following process is set forth as a series of steps. Without departing from the inventive concepts described herein, some of the steps can be carried out in a different order and/or concurrently, other steps can be added and one or more steps can be omitted.

The process of synchronous rejection can start with measurements of the period and phase of the interfering signal 106 (FIG. 2), which is represented as waveform 41 in FIG. 3. In one embodiment, the controller 100 can include or have access to a relatively precise real-time clock to assist in timing measurements of the interfering signal, such as but not limited to period and phase. For an interfering signal with a frequency of about 100 Hz, time measurements preferably should be resolvable to around a microsecond or better.

In the example of FIG. 3, the interfering signal results from a power line (e.g., utility power). In this example, a coupling to the power line can give a large signal from which zero crossings can be easily and accurately measured. Measuring the times of occurrence of one or several zero crossings where the signal has a particular slope (e.g., a positive slope or a negative slope) should give satisfactorily accurate values for the period and phase of signal 41. There are, of course, many other suitable ways in which the period and phase of signal 41 may be measured.

If the frequency of the signal 41 is subject to variation, interference rejection can be maximized when the values for the period and phase of the signal 41 are measured close to the start of DUT measurement (e.g., before a start time 51), such as within a few cycles of the signal 41. Before a measurement reading pair is started, a time duration 52 from the most recent zero crossing 49 of the signal 41 to the start time 51 of the first reading interval (time interval 54 plus 55) may be used to define the phase of this interfering signal 41.

Next, the phase of the stimulus generator 101 that produces the reference signal (indicated in FIG. 3 as signal 42) is measured. This is trivial in the example of FIG. 2 since the reference signal 111 is generated by the stimulus generator 101 component of the controller 100. In essence, the controller 100 "knows" the phase of the reference signal 111 since, in this example, code in the controller can generate signal 111.

Thereafter, the controller 100 can be programmed to wait from the start of the first reading interval 51 for a predetermined or derived amount of time, or settling time 54, before the integration time A 55 begins at $t_0$ 45. The use of a settling time 54 and the settling time's duration is mainly dependent upon the implementation of the SR system components, such as the measurement apparatus 102, and how quickly those components respond to changes in frequency and/or phase of the stimulus signal 107. The settling time 54 can be zero or greater.

Next, the first of a pair of measurements is made. Results of the measurement are contained in a signal output by the integrator 114. The integrator 114 integrates the detected signal 109 over integration time A 55 from $t_0$ 45 to $t_1$ 46. The duration of this integration time A 55 is relatively unimportant but, as will become apparent, should be known to a relatively high degree of precision. After reaching $t_1$ 46, the controller 100 obtains the first of a pair of measurement results produced by integrator 114.

Next, time is available between time marker 46 and time marker 56 for the controller 100 to perform data processing chores, especially preparing for the second of the pair of measurements that is to be made. Preparation can include obtaining updated data for the phase of the interfering signal 41. Phase data can be obtained by monitoring the zero crossings of the interfering signal 41 during time intervals 54 and 55. The current phase of the reference signal 42 (signal 111 in FIG. 2) also should be noted. The controller 100 can then define a specific future time that is to be the start 59 of the second reading interval (time interval 60 plus 61).

To maximize interference rejection, the phase of the signal output by the stimulus generator 101 (as represented by reference signal 42), such signal being treated as if it were not in its inverted state, and the phase of the interfering signal 41 at the start 59 of the second reading interval should be the same or about the same as their respective phases at the start 51 of the first reading interval. In the case of the interfering signal 41, the start 59 of the second reading interval is chosen such that the interfering signal 41 will have the desired phase at the start 59 of the second reading interval by waiting. In the case of the stimulus generator 101 (and reference signal 42), the phase of the signal 42 can be explicitly adjusted to be at the desired phase angle at time 59. In practice, to achieve this maximization, the point in time when the desired phase angle of the interfering signal 41 will occur is predicted (e.g., determined before the desired phase angle occurs). Predicting the desired phase angle can avoid a lack of time to adjust the stimulus and/or reference signals to have a desired phase(s) value at the occurrence of the desired phase angle of the interfering signal 41. The interfering signal 41 preferably behaves in a predictable manner, such as having an inherently regular periodicity or invoking (e.g., triggering) a cycle of the interference.

In addition to the phase adjustment of the stimulus generator 101 output described above, the waveform of the generator 101 should be inverted for the duration of the second reading interval (time interval 60 plus 61). The state of inversion is relative to the signal produced by the generator 101 during the first reading interval (time interval 54 plus 55). The specifics of how this phase shift and change of inversion state are implemented can vary.

If the stimulus generator 101 produces a waveform having only odd harmonics (unlike the illustrated embodiment of FIG. 3), then instead of performing an explicit change to the state of inversion, an implicit change to the state of inversion can be performed by adding an additional 180 degrees to the phase shift of generator 101.

The controller 100 can be programmed to allow (e.g., by calculation) enough time before the start time 59 of the second reading interval to complete the phase change of the stimulus generator 101 so that the phase of the signal 42 has the desired value at time 59. Notice that the desired phase angle of the interfering signal 41 at start time 59 happens only once during each period of signal 41. This causes the allowed choices of starting times 59 to be predictable.

After determining the start time 59, the controller 100 causes the stimulus generator 101 to perform the desired phase shift and change in state of inversion of the reference signal 42. The phase shift and change in state of inversion is performed and completed during time interval 58. The controller 100 is simultaneously waiting for the interfering signal 41 to reach the desired phase angle. This phase angle is assumed to be reached at the end of time interval 58 and coincides with the start 59 of the second reading interval (time interval 60 plus 61). The time allowed (e.g., by calculation) for the time interval 58 will be implementation and application dependent.

In one example embodiment, during time interval 58 of FIG. 3, the stimulus generator 101 can be used to rapidly or instantaneously change the phase and state of inversion of the reference signal as illustrated by example in reference waveform 42 (note dashed circle surrounding the change).

The controller 100 can be programmed to wait from the start of the second reading interval 59 for a predetermined or derived amount of time, or settling time 60, before the integration time B 61 begins at $t_2$ 47. In the illustrated embodiment, the settling time 60 is the same as the corresponding settling time 54 in the first reading interval. The use of a settling time 60 and the settling time's duration is mainly dependent upon the implementation of the SR system components, such as the measurement apparatus 102, and how quickly those components respond to changes in frequency and/or phase of the stimulus signal 107. The settling time 60 can be zero or greater.

Next, the second of the pair of measurements is made. Results of the measurement are contained in a signal output by the integrator 114. The integrator 114 integrates the detected signal 109 over integration time B 61 from $t_2$ 47 to $t_3$ 48. This integration time B 61 can be the same, or approximately the same, as the corresponding integration time A 55 in the first reading interval. As should be appreciated, synchronous rejection can be maximized when the integration times A and B are the same. After reaching $t_3$ 48, the controller obtains the second of the pair of measurement results produced by the integrator 114.

The controller uses adder 115 to add the pair of measurement results respectively obtained during integration time A 55 and integration time B 61. The final result 116 contains a value representing the desired SR system output while rejecting at least a portion of the interfering signal and the interfering signal's harmonics. If the interfering signal and harmonics are the same for each integration time A and B, and the timing and phase relations described above are each correlated with precision, then it should be possible to reject all of the interfering signal and any harmonics thereof by as much as sixty db or higher. However, it is contemplated that some degree of synchronous rejection can be achieved with less precise timing and phase relationships and it should be understood that imprecise synchronous rejection techniques and systems are intended to fall within the scope of the present invention as defined by the claims appended hereto.

Selected Advantages

One advantage of the foregoing example method of synchronous rejection is the ability to reject to a high degree the fundamental frequency of an interfering signal as well as harmonics of the interfering signal, wherever those harmonics may lie in the passband of the SR system. Furthermore, other than measuring the period and phase of the interfering signal, no particular or a priori relationship is required between the interfering signal and the stimulus/reference signals.

The waveform of the rejected interference may be complex. In the case of power line interference, this complexity results from various harmonics or discontinuities caused by nonlinear power loads such as switching power supplies and fluorescent lamp ballasts. In practice, the method of synchronous rejection has been shown to reduce the interfering signal by as much as about sixty db independent of the complexity and harmonic content of the waveform.

Maximization of Interference Signal Rejection

To attain maximum interference signal rejection from the synchronous rejection embodiments described herein, the following four characteristics and conditions should be present as the degree of rejection may be dependent upon the precision with which these characteristics and conditions are implemented.

First, the interfering signal is repeatable and the stimulus and/or reference signals are synchronizable with the interfering signal. To achieve synchronization of the stimulus signal, the implementing apparatus should meet the second and third conditions identified in the immediately following two paragraphs.

Second, generation of the stimulus and/or reference signals is precisely controllable and the stimulus and/or reference signals are changeable. The controller should be able to change the phase and the state of inversion of the stimulus and/or reference signals very quickly and precisely, and should be able to make closely spaced readings.

Third, the controller should have access to samples of the fundamental frequency of the interfering signal to obtain precise, real-time measurements of the interfering signal's period and phase angle. A zero crossing detector will often be sufficient.

Fourth, the highest S/N ratios can be obtained when all aspects of the interference are essentially constant during the entire measurement time interval.

Performance

Figure 6:
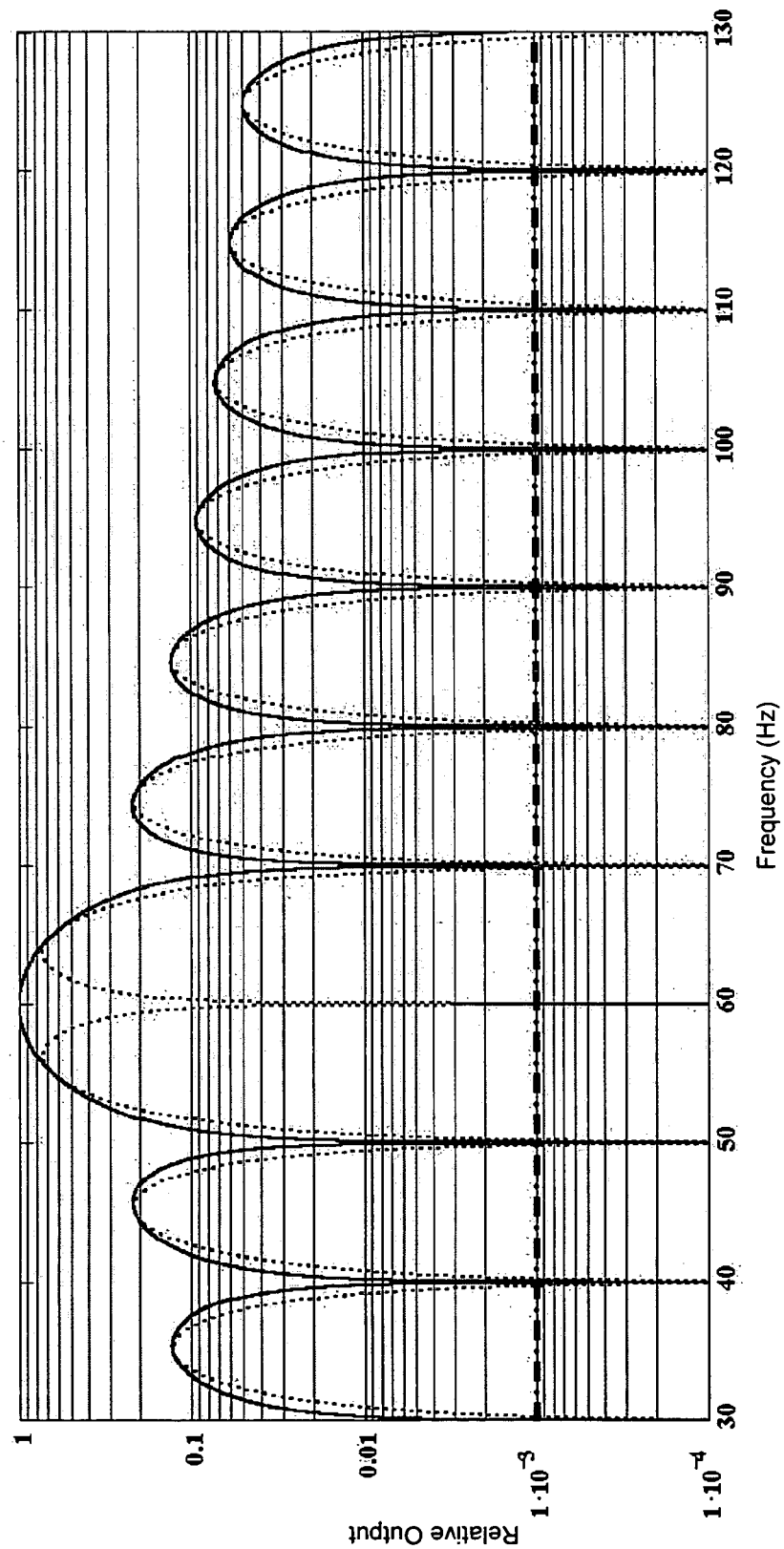
FIG. 6 is a graph of the performance of synchronous rejection in accordance with the present invention versus the performance of conventional synchronous detection (CSD) and conventional synchronous detection with asynchronous commutation (SDAC).

FIG. 6 shows a graph of the performance of the foregoing example method of synchronous rejection compared to CSD and SDAC. The vertical axis shows the attenuation factor for each kind of filter over a frequency range of 30 to 130 Hz. The vertical axis is logarithmic and covers a range of 10,000 (80 db). The frequency of the stimulus and reference signals is set to 60 Hz.

The curves drawn with the solid line show the typical performance of CSD using a rectangular sampling window of 0.1 seconds. If the frequency of the interfering signal is 50 Hz, its second harmonic will be at 100 Hz and the remaining harmonics will occur at 50 Hz intervals. CSD works well at 50 Hz in this case since there is a notch at the frequency of the interfering signal and at each of its harmonics. For an interfering frequency of 60 Hz, CSD will fail since there is no attenuation at all of the interfering signal at the stimulus/reference frequency.

However, SDAC can improve upon the performance of CSD for the interfering frequency of 60 Hz. The curves drawn with the dotted line show the typical performance of SDAC using two adjacent rectangular sampling windows each of 0.1 seconds width and opposite state of stimulus/reference signal inversion. FIG. 6 quickly reveals that SDAC and CSD are very similar in performance except that SDAC has an additional notch at the 60 Hz stimulus/reference frequency. This additional notch provides enough attenuation to allow the stimulus/reference and fundamental interference frequencies to be the same.

While it may appear that SDAC can work well enough to allow operation at or near power line frequencies (e.g., 60 Hz in the United States and 50 Hz in most European countries), this capability turns out to be limited. The problem is that the width of the central SDAC notch is too narrow to ensure that the frequency of the power line is centered well enough in the notch to achieve satisfactory attenuation when operating near power line frequencies. The width of this notch at an attenuation of 0.1 (20 db) is ±0.3 Hz. Below there, the width decreases roughly linearly with attenuation so that it is about ±0.03 Hz at an attenuation of 0.01 (40 db) and ±0.003 Hz at an attenuation of 0.001 (60 db). In practice, the frequency of some nation's power grids is stable enough for SDAC to perform well. However, this is not the case for every power grid or portions of otherwise stable power grids. For example, the power grid in Great Britain fluctuates +/−0.1 Hz, which is outside the effective range of SDAC.

The dash-dotted line shows that the typical performance of synchronous rejection gives an attenuation of about 0.001 (60 db), independent of the interference frequency. This unexpected result occurs because this dash-dotted line represents only the attenuation of interference that is synchronous with the interference source 106. The line is flat because the synchronous rejection method tracks the interference frequency, thereby giving performance effectively equivalent to being in a notch regardless of whether the frequency of the interference source varies.

Although the performance of the foregoing method of synchronous rejection is similar to that of the SDAC method for interference that is not synchronous with the interference source, it is believed that the performance of the foregoing method of synchronous rejection at the interference frequency is a valuable addition to many types of SR systems.

Synchronous Rejection in Ratio Transformer Capacitance Bridges

One application of the method of synchronous rejection and apparatus for conducting synchronous rejection described herein is in making measurements with an electrical bridge. As a specific example, described below is synchronous rejection as applied to a ratio transformer capacitance bridge (RTCB) similar to those shown and described in U.S. Pat. Nos. 6,204,673 and 4,772,844, the disclosures of which are herein incorporated by reference in their entireties.

Figure 4:
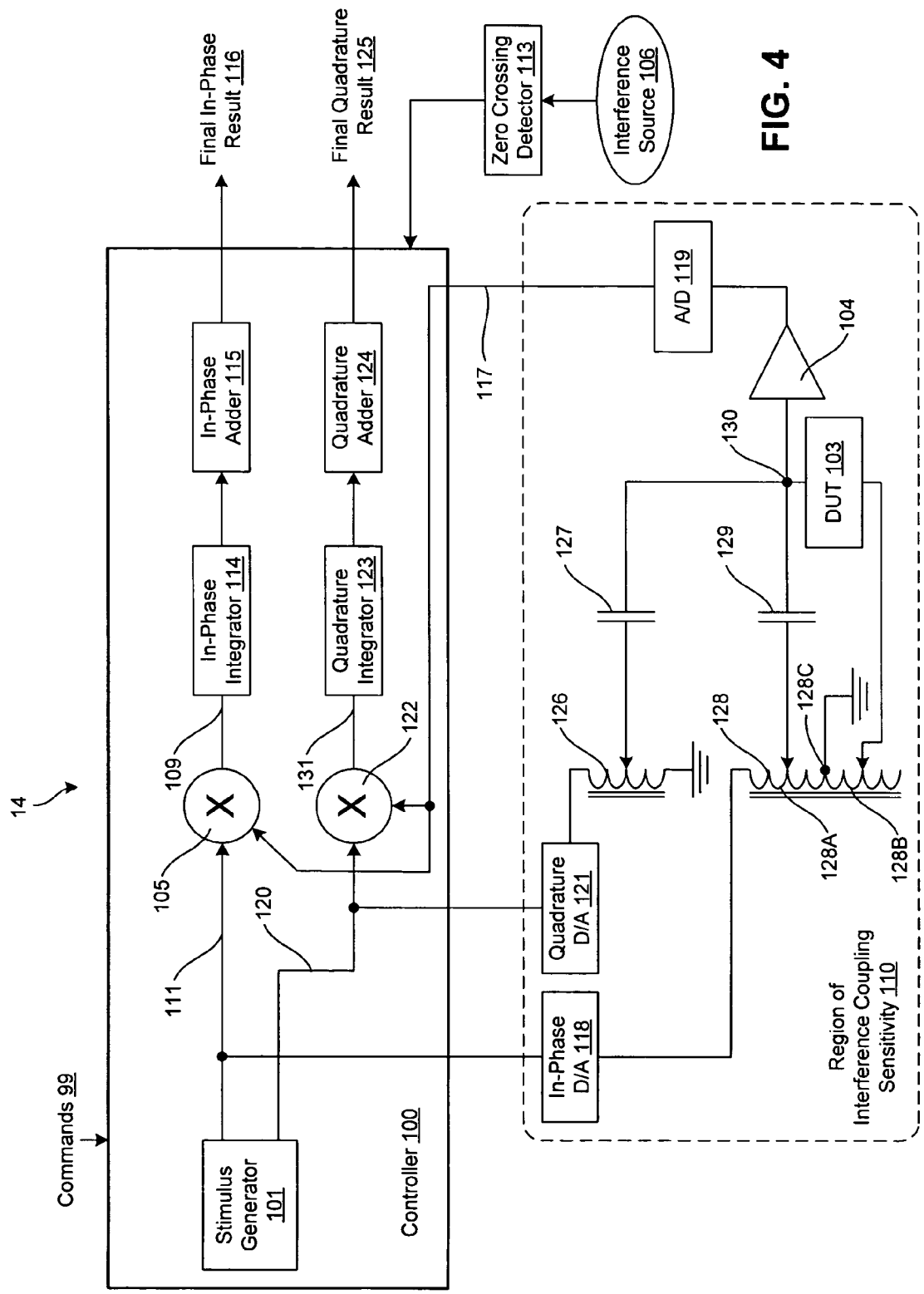
FIG. 4 is a schematic diagram of a ratio transformer capacitance bridge having an associated synchronous rejection system in accordance with the present invention.

With reference now to FIG. 4, shown is a system 14 that includes a ratio transformer capacitance bridge and an associated synchronous rejection system. The system 14 includes a controller 100 (e.g. digital signal processor). The controller 100 includes a stimulus generator 101 that produces a sinusoidal in-phase stimulus/reference signal 111 and a sinusoidal quadrature stimulus/reference signal 120. A ninety degree phase shift is maintained between signals 111 and 120 while measurements are being taken. Signals 111 and 120 are respectively input to an in-phase D/A 118 and a quadrature D/A 121 that, in turn, respectively drive an in-phase ratio transformer 128 and a quadrature ratio transformer 126. Signals 111 and 120 also are input to an in-phase synchronous detector 105 and a quadrature synchronous detector 122 where they are used as reference signals.

The measurement apparatus can include a ratio transformer capacitance bridge circuit having the ratio transformers 126 and 128, and abstract reference capacitors 127 and 129. In-phase ratio transformer 128 includes windings 128A and 128B. Node 128C includes the junction of windings 128A and 128B. Node 130 includes connections to components 127,129 and 103. A bridge unbalance signal occurs between node 128C and node 130.

This bridge unbalance signal is amplified with a preamplifier 104 (also referred to as a response amplifier) and converted to a digital signal with an A/D 119. The resulting digital response signal 117 is synchronously detected with detectors 105 and 122 to respectively produce an in-phase detected result signal 109 and a quadrature phase detected result signal 131.

The controller 100 is provided with real time information from a zero crossing detector 113 indicating when the interference source 106 (e.g., power line) has crossed through zero voltage with a positive slope.

The measurement process used by the RTCB system is very similar to the above described method of synchronous rejection in FIG. 2. One difference, however, is the presence of two (rather than one) synchronous detectors 105 and 122 and their following processing components 114, 115, 123 and 124. This reflects the fact that the measurement of impedance (as opposed to, for example, resistance or temperature) involves two dimensions instead of one. The second detector and its processing elements merely add a second (quadrature) output channel, but the synchronous rejection process can be simultaneously applied in the same way and at the same moments using the in-phase and quadrature stimulus/reference signals 111 and 120 (FIG. 4), but where the in-phase and quadrature stimulus/reference signals 111 and 120 are created with a 90 degree phase shift relative to each other (see, for example, U.S. Pat. No. 6,204,673). Similarly, the synchronous rejection process carries through to the processing components 114, 115, 123 and 124.

Figure 5:
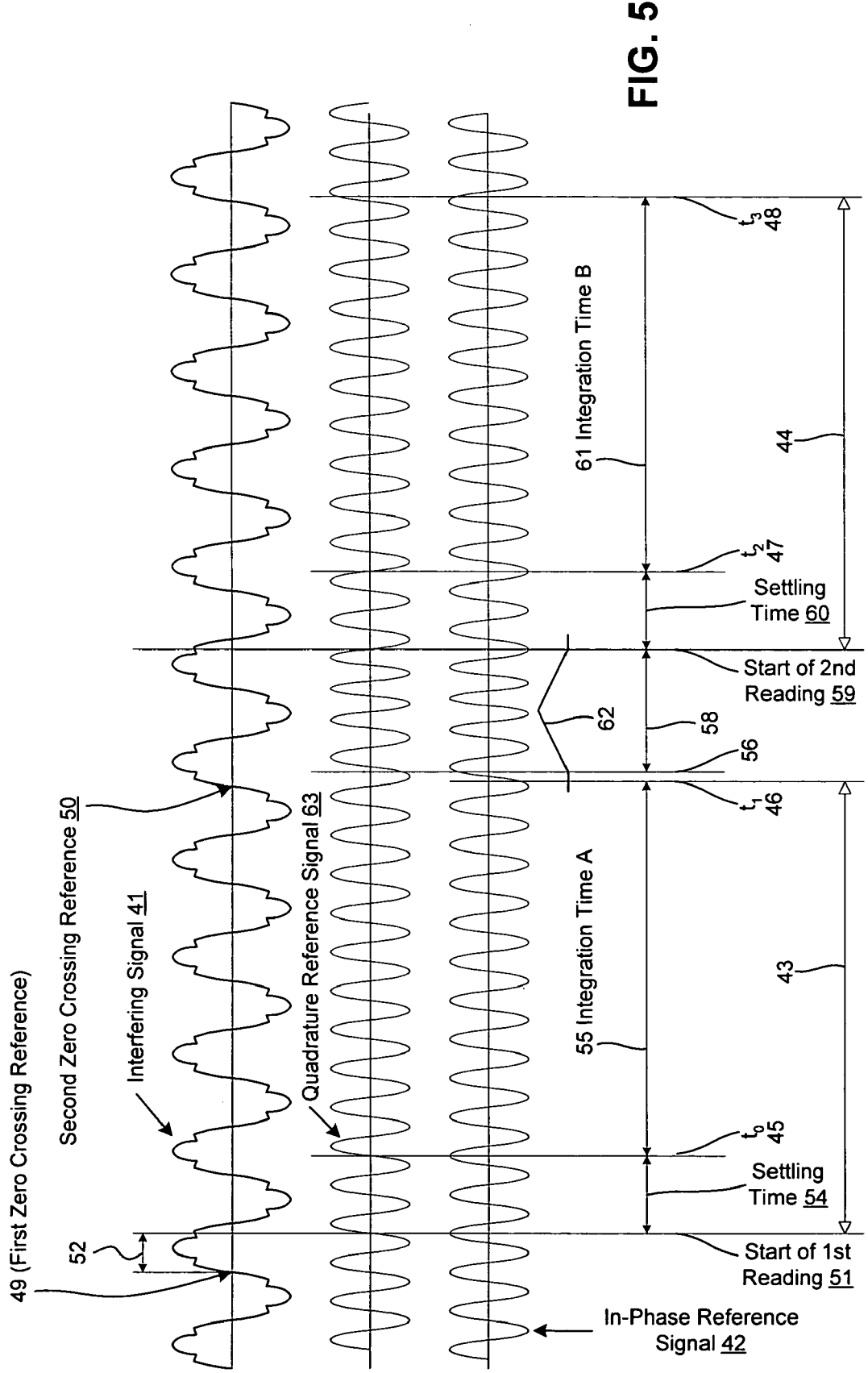
FIG. 5 is a timing diagram of the ratio transformer capacitance bridge of FIG. 4.

With additional reference to FIG. 5, shown is an example timing diagram during measurements taken using synchronous rejection in an RTCB. In FIG. 5, the in-phase reference signal is given reference numeral 42 and the quadrature reference signal is given reference numeral 63.

In the RTCB system, the stimulus generator 101 produces sinusoidal signals with minimal even harmonics. This permits the relative state of signal inversion between integration time intervals 55 and 61 to be implemented as a 180 degree phase shift, rather than as an explicit inversion.

With a DSP driving a D/A, one way to produce the desired phase shift is in a sudden transition (e.g., FIG. 3). However, a sudden transition in the stimulus signal driving a ratio transformer is not generally advisable. More specifically, when a ratio transformer is driven by a sinusoidal signal that causes the transformer's ferromagnetic core to approach magnetic saturation, frequency variations can lead to saturation of the core even though the transformer is driven by a constant voltage. For these reasons, the phase shift made during time interval 58 is accomplished by increasing the frequency of the stimulus signal. This brief frequency increase can be done in a smooth manner by uniformly ramping the frequency up during the first half of interval 58, then ramping it down during the second half of 58. The superimposed graph 62 in FIG. 5 shows one embodiment of ramping the frequency versus time. The phase can be adjusted by any amount during time interval 58.

The functions of the stimulus generator 101, the detectors 105 and 122, the integrators 114 and 123 and the adders 115 and 124 can be implemented as circuit components or embodied in executable code. If embodied as executable code, the code can be stored on a computer readable medium or implemented in software or firmware.

Mathematical Description of Synchronous Rejection

Consider two time intervals, referred to as time interval A and time interval B. Time interval A is defined over $t_o \leq t \leq t_1$ and time interval B is defined over $t_2 = (t_0 + \Delta) \leq t \leq (t_1 + \Delta) = t_3$.

A repeatable interfering signal I(t) exists. During time interval A, the interfering signal can be described as $I_A(t) = I(t)$. During time interval B, the interfering signal can be described as $I_B(t) = I_A(t - \Delta)$.

A repeatable reference signal C(t) exists. During time interval A, the reference signal can be described as $C_A(t) = C(t)$. During time interval B, the reference signal can be described as $C_B(t) = -C_A(t - \Delta)$.

A desired or measurable signal M(t) exists. This signal is a function of a stimulus signal. During time interval A, the measured signal can be described as $M_A(t) = M(t)$. During time interval B, the measured signal can be described as $M_B(t) = -M_A(t - \Delta)$.

Given this information, a detected and integrated value during time interval A may be defined by Eq. 1.

$$\int_{t_0}^{t_1} \{M_A(t) \cdot C_A(t) + I_A(t) \cdot C_A(t)\} dt \qquad \text{Eq. 1}$$

Similarly, a detected and integrated value during time interval B may be defined by Eq. 2.

$$\int_{(t_0+\Delta)}^{(t_1+\Delta)} \{M_B(t) \cdot C_B(t) + I_B(t) \cdot C_B(t)\} dt \qquad \text{Eq. 2}$$

Using the definitions above, the following relations are true:

$I_B(t_0+\Delta) = I_A(t_0)$ $I_B(t_1+\Delta) = I_A(t_1)$ $C_B(t_0+\Delta) = -C_A(t_0)$ $C_B(t_1+\Delta) = -C_A(t_1)$ $M_B(t_0+\Delta) = -M_A(t_0)$ $M_B(t_1+\Delta) = -M_A(t_1)$ Making the above substitutions along with the corresponding adjustment to the integration interval in Eq. 2, the result in Eq. 3 is obtained for time interval B.

$$\int_{t_0}^{t_1} \{-M_A(t) \cdot (-C_A(t)) + I_A(t) \cdot (-C_A(t))\} dt \qquad \text{Eq. 3}$$

The measurement terms in Eq. 1 and Eq. 3 can be gathered to form Eq. 4. Similarly the interference terms can be gathered to form Eq. 5.

$$\int_{t_0}^{t_1} \{I_A(t) \cdot C_A(t) + I_A(t) \cdot (-C_A(t))\} dt = 0 \qquad \text{Eq. 5}$$

The result is that the two interference terms have exactly the same magnitude but opposite signs and therefore exactly cancel as shown in Eq. 4. The two measurement terms have exactly the same magnitude and sign so they form a sum that is twice the size of either original term as shown in Eq. 5.

Mathematically Based Conclusions

The above mathematical modeling of synchronous rejection allows a number of conclusions to be drawn. Some of these are listed below in roman numeral paragraphs. Of course, for a given conclusion to be applicable in practice, underlying mathematical assumptions behind that conclusion should be supported by the performance of the apparatus to the same degree that the conclusion is to be accurate. Some practical limitations of apparatus include limited resolution, limited dynamic range, limited linearity, limited stability, and so on.

I. The interfering signal I(t) is repeatable, but does not need to be periodic.

II. It is desirable to know when the interfering signal will start and the length of time over which it is repeatable $(t_1 - t_0)$.

III. An interfering signal can be canceled, independent of the shape of the interfering signal.

IV. A periodic interfering signal and all its harmonics can be canceled independent of the interfering signal's harmonic and phase content.

V. The quality of the interference cancellation depends on the repeatability of the interfering signal I(t).

VI. The quality of the interference cancellation depends on the repeatability and invertability of the reference signal C(t) and of the stimulus signal.

VII. The reference signal can have any shape and therefore, if the reference signal is periodic, any harmonic and phase content.

VIII. The stimulus signal can have any shape and therefore, if the stimulus signal is periodic, any harmonic and phase content.

IX. The quality of the interference cancellation may depend on the linearity of the synchronous detectors In the SR system and on the degree to which the interference signal obeys the principle of superposition in the interference signal's interaction with other signals in the SR system.

X. In practice $\Delta > t_1 - t_0$ since the same apparatus is used to generate the reference signal for time interval B as for time interval A.

XI. Eq. 5 shows that no particular relationship between the stimulus signal (in M(t)) and the reference signal C(t) is required to get high quality cancellation of the interference signal. However, the product $M_A(t)C_A(t)$ in Eq. 4 shows that the magnitude of the desired signal that is produced does depend on this relationship. Therefore, while excellent interference cancellation can be obtained without regard to the relationship between the stimulus signal and the reference signal, preferred embodiments of this invention try to optimize this relationship in order to optimize the S/N ratio.

Extension of Synchronous Rejection to Plural Interfering Signal Frequencies

Synchronous rejection can be extended to reject multiple interfering periodic signals, each having a different fundamental frequency. These fundamentals may all be asynchronous with respect to each other. The extension to plural interfering signals involves taking readings and performing an integration for corresponding time intervals.

The following roman numeral paragraphs describe an example approach to rejecting multiple interfering periodic signals.

I. Define N as the number of interfering signals to be synchronously rejected. Then the number of integration time intervals to be measured and summed is $2^N$. These integration time intervals are indexed with a variable i.

II. $I_1, I_2, I_3, \ldots I_N$ are the interference signals. Their corresponding periods are $P_1, P_2, P_3, \ldots P_N$. These periods have corresponding integer multipliers which are $k_1, k_2, k_3, \ldots k_N$. The corresponding time interval adders are $\Delta_1 = k_1 P_1, \Delta_2 = k_2 P_2, \Delta_3 = k_3 P_3, \ldots \Delta_N = k_N P_N$.

III. Arrange the $\Delta$s in descending order from left to right. The values of $k_i$ should be chosen so that adjacent $\Delta$s differ by at least a factor of two. The quality of interference cancellation should be better to the extent that the least stable interference signals are placed in the rightmost positions in this arrangement. Nevertheless, any changes in $\Delta_i$ (as a result of a change in $P_i$) while a set of readings is being taken might reduce the quality of the cancellation.

IV. This ordering of the $\Delta$s corresponds to the binary integer i, having N bits where $0 \leq i \leq 2^N - 1$. A set of readings and an integration yielding $D_i$ should be performed for each value that i can have.

V. If the number of binary bits in i that are equal to one is even, then the stimulus/reference signals are to be normal (uninverted) during the $i^{th}$ integration. If the number of binary bits in i that are equal to one is odd, then the stimulus/reference signals are inverted during this integration. The values "+1" and "−1" are assigned to these two cases, respectively. Define the function S(i)= +1 if the number of bits in i that are equal to one is even. S(i)=−1 otherwise.

VI. A first set of readings and corresponding integration (this set referred to as $D_0$) can occur at any moment, but the phase of each of the interfering signals should be known or determinable at that moment. By definition, $D_0$ is obtained with i=0 and with the stimulus/reference signals to be in the normal (e.g., uninverted) or inverted state, respectively.

VII. $D_1$ is obtained with i=1 and with the stimulus/ reference signals inverted. Each time i is incremented to prepare to obtain $D_i$, a choice can be made as to which of the interfering signals that the stimulus/reference signals are to be synchronized with. The interfering signal to be synchronized with is the one that corresponds to the most significant bit position in i that changed when i was incremented.

VIII. The process is continued until a complete set of $D_i$ is obtained using all $2^N$ values if i. These are added together as shown in Eq. 6 to give the final value for the desired signal.

$$\sum_{i=0}^{2^N-1} D_i = \sum_{i=0}^{2^N-1} S(i) \int_{t_i}^{t_i+\delta} M(t) \cdot C(t) \, dt \qquad \text{Eq. 6}$$

The starting time for each integration time interval is $t_i$. The starting time of the $i^{th}$ integration time interval is found by adding the sum of all the time interval adders whose corresponding bit in the binary value of i is a one. These are listed below for the N equals four case. Notice that the interference signal for the least significant time interval adder for $t_i$ is the one to which the stimulus/reference signals are synchronized. The length $\delta$ of the integration time intervals are ideally all the same.

As an example, table 1 identifies a situation where N equals four and i has sixteen values. The decimal values of i are listed in the first column below. The second column gives the binary values of i where the four bit positions correspond to the four time interval adders $\Delta_4, \Delta_3, \Delta_2$ and $\Delta_1$, respectively. The third column contains the normal/inverted state for each value of i. The fourth column shows which interfering signal ($I_4, I_3, I_2, I_1$) the stimulus/reference signals are synchronized with. The last column gives the starting time of the $i^{th}$ measurement/integration interval.

TABLE 1

| Dec i | Bin i | S (i) | Sync to | $t_i$ |
|---|---|---|---|---|
| 0 | 0000 | +1 | n/a | $t_0 = t_0$ |
| 1 | 0001 | −1 | $I_1$ | $t_1 = t_0 + \Delta_1$ |
| 2 | 0010 | −1 | $I_2$ | $t_2 = t_0 + \Delta_2$ |
| 3 | 0011 | +1 | $I_1$ | $t_3 = t_0 + \Delta_2 + \Delta_1$ |
| 4 | 0100 | −1 | $I_3$ | $t_4 = t_0 + \Delta_3$ |
| 5 | 0101 | +1 | $I_1$ | $t_5 = t_0 + \Delta_3 + \Delta_1$ |
| 6 | 0110 | +1 | $I_2$ | $t_6 = t_0 + \Delta_3 + \Delta_2$ |

TABLE 1-continued

| Dec i | Bin i | S (i) | Sync to | $t_i$ |
|---|---|---|---|---|
| 7 | 0111 | −1 | $I_1$ | $t_7 = t_0 + \Delta_3 + \Delta_2 + \Delta_1$ |
| 8 | 1000 | −1 | $I_4$ | $t_8 = t_0 + \Delta_4$ |
| 9 | 1001 | +1 | $I_1$ | $t_9 = t_0 + \Delta_4 + \Delta_1$ |
| 10 | 1010 | +1 | $I_2$ | $t_{10} = t_0 + \Delta_4 + \Delta_2$ |
| 11 | 1011 | −1 | $I_1$ | $t_{11} = t_0 + \Delta_4 + \Delta_2 + \Delta_1$ |
| 12 | 1100 | +1 | $I_3$ | $t_{12} = t_0 + \Delta_4 + \Delta_3$ |
| 13 | 1101 | −1 | $I_1$ | $t_{13} = t_0 + \Delta_4 + \Delta_3 + \Delta_1$ |
| 14 | 1110 | −1 | $I_2$ | $t_{14} = t_0 + \Delta_4 + \Delta_3 + \Delta_2$ |
| 15 | 1111 | +1 | $I_1$ | $t_{15} = t_0 + \Delta_4 + \Delta_3 + \Delta_2 + \Delta_1$ |

The foregoing example shows a preferred ordering, but it should be appreciated that other orderings should give useful results.

Rejection of a Slowly Changing Interfering Signal

As indicated above, if the phase angle, the frequency and/or the amplitude of the interfering signal has changed slightly between the first and second readings, there may not be a complete cancellation of the interfering signal.

By taking additional paired sets of readings in particular sequences, the method of synchronous rejection can be enhanced to better reject interference that is slowly changing during the measurement time interval.

The paired set of readings described above used two integration intervals labeled integration time A and integration time B. This paired set of readings is herein called simply "AB". This label is intended to indicate that the first integration time uses a normal stimulus signal while the second integration time uses an inverted stimulus signal. In the same manner, the label "BA" is intended to indicate a reversed order.

Now suppose the first two readings are AB; the third reading is B again since the third reading is made with the stimulus phase reversed from the first reading; and the fourth reading is A since the fourth reading is made with the same state of inversion as the first reading. This means that readings ABBA were taken whereas a normal operation pattern would be ABAB.

Assume that the interfering signal is slowly and linearly changing, such that the magnitude of the final results (e.g., final result 116 of FIG. 2 or final results 116 and 125 of FIG. 4) measured during each integration time interval is falling by δ with each successive reading. It is noted that the final results 116 may alternatively be rising and similar results can be obtained.

First consider the conventional ABAB case. If the first time interval gives a final result for the interference of (x), then the second will be −(x−δ), the third will be +(x−2δ) and the fourth will be −(x−3δ). The average of each adjacent pair is (x−x+δ)/2=δ/2 and (x−2δ−x+3δ)/2=δ/2. Averaging these two pairs gives (δ/2+δ/2)/2=δ/2. The average of the four of these is the same: (x−x+δ+x−2δ−x+3δ)/4=δ/2. The ABAB pattern incompletely cancels the interference leaving an error of δ/2 in each final result pair. Averaging the results of both pairs does not offer improvement.

Now consider the ABBA case, if the first time interval gives a final result for the interference of (x), then the second will be −(x−δ), the third will be −(x−2δ) and the fourth will be +(x−3δ). The average of the four of these is x−x+δ+x+2δ−x−3δ=0.

In the ABBA case, the linearly changing interference was completely, or almost completely, rejected by measuring four integration time intervals in an ABBA pattern and averaging the final results of all four to achieve interference rejection.

Conclusion

Although particular embodiments of the invention have been described in detail, it is understood that the invention is not limited correspondingly in scope, but includes all changes, modifications and equivalents coming within the spirit and terms of the claims appended hereto.

What is claimed is:

1. A method of substantially cancelling a repeatable interference signal by synchronous rejection, wherein:
   a desired signal exists that is a function of a repeatable stimulus signal; and
   a response signal exists that includes the interference signal plus the desired signal, comprising:
      defining first and second equal time intervals; wherein:
         the interference signal has a first interference waveshape during the first time interval and a second interference waveshape during the second time interval;
         the relationship of the starting time of the second time interval to the starting time of the first time interval is such that the second interference waveshape is expected to be substantially the same as the first interference waveshape; and
         a repeatable reference signal has a first reference waveshape during the first time interval and a second reference waveshape during the second time interval;
      adjusting the reference signal during the time between the first and second time intervals so that an uninverted second reference waveshape is the same as the uninverted first reference waveshape; and
      integrating a product of the response signal times the reference signal over the first and second time intervals to obtain a final result substantially without the interference signal, wherein the second reference waveshape is in an inverted state relative to the state of inversion of the first reference waveshape.

2. The method of claim 1, wherein the integration over the first time interval is combined with the integration over the second time interval to obtain the final result.

3. The method of claim 2, wherein the integrations are combined by adding.

4. The method of claim 1, wherein the reference and stimulus signals are the same signal.

5. The method of claim 1, wherein the stimulus and reference signals are periodic and the stimulus signal has a frequency that is the same as that of the reference signal during the two time intervals.

6. The method of claim 5, wherein the stimulus signal has a fixed phase relationship with respect to the reference signal.

7. The method of claim 1, wherein the stimulus and reference signals are periodic and the stimulus signal has a fixed phase relationship with respect to the reference signal during the two time intervals.

8. The method of claim 1, wherein the interference signal is periodic and the method further comprises starting the first and second time intervals at the same phase angle of the fundamental frequency of the interference signal.

9. The method of claim 8, wherein the relationship of the first and second time intervals is achieved by:

measuring the time of occurrence of at least one of positive and negative zero crossings of a signal wherein the signal has the same frequency as the interference signal and the signal has a constant phase relationship with respect to the fundamental frequency of the interference signal; and starting the second time interval based on the measurement.

10. The method of claim 1, wherein the reference signal is periodic and the method further comprises adjusting the phase of the reference signal during the time between the first and second time intervals so that the phase of the uninverted second reference waveshape is the same as the phase of the uninverted first reference waveshape at the start of both time intervals.

11. The method of claim 10, wherein the inverted state of the second reference waveshape relative to the state of inversion of the first reference waveshape is achieved by shifting the phase of the reference signal by 180 degrees relative to the phase of the first reference waveshape.

12. The method of claim 10, wherein the reference and stimulus signals have the same frequency and said adjusting is done in a way that maintains a fixed phase relationship between the reference and stimulus signals.

13. The method of claim 1, wherein said defining comprises determining the starting time of the second time interval using a prediction based on realtime calculations.

14. The method of claim 1, wherein said adjusting the reference signal during the time between the first and second time intervals is based on realtime calculations.

15. The method of claim 1, wherein the interference signal is substantially canceled independent of the waveshape of the interference signal.

16. The method of claim 15, wherein the interference signal has a frequency in the range from about 30 Hz to about 130 Hz.

17. The method of claim 1, wherein the inverted state of at least one of the reference signal and the stimulus signal is achieved by a programmed change in a waveform from a signal generator.

18. The method of claim 1, wherein the response signal is generated by a stimulus-response system.

19. The method of claim 18, wherein the stimulus-response system is a ratio transformer capacitance bridge (RTCB) and the integrations are carried out for a product of in-phase reference and response signals and for a product of quadrature reference and response signals.

20. The method of claim 19, wherein the stimulus-response system is a ratio transformer capacitance bridge (RTCB) and the adjustments are carried out for each of in-phase and quadrature reference signals.

21. The method of claim 20, wherein the RTCB includes:
a bridge circuit;
at least one ratio transformer coupled in the bridge circuit;
a response amplifier coupled across the bridge to amplify an extent of imbalance;
a first terminal of an abstract reference capacitor coupled to an input of the response amplifier; and
a second terminal of the abstract reference capacitor coupled to the at least one ratio transformer.

22. The method of claim 1, wherein said method is performed twice in succession resulting in a first performance of the method of claim 2 and a second performance of the method of claim 1 and wherein the states of inversion of the stimulus and reference signals during the first and second time intervals of the second performance are inverted relative to their respective states of inversion during the first and second time intervals of the first performance.

23. The method of claim 22, further comprising adding the integration results from the first performance of the method of claim 1 to the integration results from the second performance of the method of claim 1 to obtain the final result.

24. A method of cancelling a periodic interference signal in a stimulus-response system by synchronous rejection, wherein a desired signal exists that is a function of a periodic stimulus signal, comprising:
defining first and second equal time intervals; wherein:
a periodic reference signal has a first reference waveshape during the first time interval and a second reference waveshape during the second time interval;
the stimulus signal has a first reference waveshape during the first time interval and a second stimulus waveshape during the second time interval;
during each time interval, the reference and stimulus signals have the same frequency and a fixed relative phase relationship; and
the second time interval is started at the same phase angle of the fundamental frequency of the interference signal as the first time interval was started;
adjusting the phase of the reference and stimulus signals during the time between the two time intervals so that the phase of the uninverted second reference and stimulus waveshape is the same as the phase of the respective uninverted first reference and stimulus waveshapes at the start of both time intervals; and
integrating the product of response data from the stimulus-response system times the periodic reference signal over tile first and second equal time intervals to obtain the final result substantially without the interference signal;
wherein the second reference and stimulus waveshapes are in an inverted state relative to the state of inversion of the respective first reference and stimulus waveshapes.

25. The method of claim 24, wherein the integration over the first time interval is combined with the integration over the second time interval to obtain the final result.

26. The method of claim 25, wherein the integrations are combined by adding.

27. A synchronous rejection system to cancel a periodic interference signal in a stimulus-response system, wherein a desired signal exists that is a function of a periodic stimulus signal, comprising:
a signal generator that generates the stimulus signal and a periodic reference signal and wherein the signal generator is controlled such that:
over first and second equal time intervals, the reference and stimulus signals have the same frequency and a fixed relative phase;
the second time interval is started at the same phase angle of the fundamental frequency of the interference signal as the first time interval was started;
during the second time interval the reference and stimulus signals are in an inverted state with respect to the state of inversion of the respective reference and stimulus signals during the first time interval; and
the phase of the reference end stimulus signals at the start of the second time interval is the same as the phase of the respective reference and stimulus signals at the start of the first time interval wherein the reference and stimulus signals are treated as if they are not in their said inverted states during the second time interval; and an integrator that integrates a product of response data from the stimulus-response system times the reference signal over the first and second time intervals to obtain the final result substantially without the interference signal.

28. The system of claim 27, wherein an adder adds the integration over the first time interval with the integration over the second time interval to produce the final result.

29. The system of claim 27, wherein the signal generator provides the inverted states of the reference and stimulus signals by respectively shifting the phase of the reference and stimulus signals by 180 degrees.

30. The system of claim 27, wherein the signal generator starts the second time interval at the same phase angle of the fundamental frequency of the interference signal that the signal generator started the first time interval by;

measuring the time of occurrence of at least one of positive and negative zero crossings of a signal wherein the signal has the same frequency as the interference signal and the signal has a constant phase relationship with respect to the fundamental frequency of the interference signal; and starting the second time interval based on the measurement.

31. The system of claim 27, wherein the signal generator defines the starting time of the second time interval using a prediction based on realtime calculations.

32. The system of claim 27, wherein the signal generator adjusts the reference signal during the time between the first and second time intervals based on realtime calculations.

33. The system of claim 27, wherein the interference signal is substantially canceled substantially independently of a frequency of the interference signal.

34. The system of claim 33, wherein the interference signal has a fundamental frequency in the range of about 30 Hz to about 130 Hz.

35. The system of claim 27, wherein the stimulus-response system comprises a ratio transformer capacitance bridge (RTCB) and the signal generator generates each of in-phase reference and quadrature reference signals, and the system includes:

an in-phase integrator coupled to receive the in-phase reference signal and to an in-phase adder producing a final in-phase result; and a quadrature integrator coupled to receive the quadrature reference signal and to a quadrature adder producing a final quadrature result.

36. The system of claim 35, wherein the RTCB includes:

a bridge circuit;

at least one ratio transformer coupled in the bridge circuit;

response amplifier coupled across the bridge to amplify an extent of imbalance;

a first terminal of an abstract reference capacitor coupled to an input of the response amplifier; and a second terminal of the abstract reference capacitor coupled to the at least one ratio transformer.

37. The system of claim 27, wherein at least one of the signal generator and the integrator is implemented as logic that is executed by a processor.

38. The system of claim 38, wherein the processor is a digital signal processor.

39. The system of claim 27, further comprising a controller for controlling at least one of the signal generator and the integrator.

40. The system of claim 28, wherein at least one of the signal generator and the integrator is implemented with circuitry having dedicated circuit components.

41. In combination, a measurement system for measuring a capacitance value, comprising:

a synchronous rejection system according to claim 28, wherein the signal generator generates each of in-phase reference and stimulus signals and quadrature reference and stimulus signals and wherein the system includes an integrator for each of the reference signals to respectively produce a final in-phase result and a final quadrature result; and a ratio transformer capacitance bridge (RTCB), including:

two ratio transformers respectively driven by the stimulus signals;

a plurality of abstract reference capacitors, a first terminal of each abstract reference capacitor coupled to corresponding taps of the ratio transformers and a second terminal of each abstract reference capacitor coupled to a node;

selective switching means to switch a first terminal of a device under test (DUT) to the node and switch a second terminal of the DUT to one of the ratio transformer taps; and a response amplifier having an input terminal coupled to the node.

42. The combination of claim 41, wherein the synchronous rejection system further comprises an adder associated with the in-phase integrator and an adder associated with the quadrature integrator.

* * * * *